United States Patent
Cotton et al.

(10) Patent No.: US 10,926,255 B2
(45) Date of Patent: Feb. 23, 2021

(54) APPARATUS AND METHOD FOR PROVIDING A TIME VARYING VOLTAGE

(71) Applicant: Nokia Technologies Oy, Espoo (FI)

(72) Inventors: Darryl Cotton, Cambridgeshire (GB); Adam Robinson, Cambridgeshire (GB)

(73) Assignee: Nokia Technologies Oy, Espoo (FI)

( * ) Notice: Subject to any disclaimer, the term of this patent is extended or adjusted under 35 U.S.C. 154(b) by 24 days.

(21) Appl. No.: 15/575,141

(22) PCT Filed: May 13, 2016

(86) PCT No.: PCT/FI2016/050318
§ 371 (c)(1),
(2) Date: Nov. 17, 2017

(87) PCT Pub. No.: WO2016/185086
PCT Pub. Date: Nov. 24, 2016

(65) Prior Publication Data
US 2018/0143159 A1 May 24, 2018

(30) Foreign Application Priority Data
May 21, 2015 (EP) .................................. 15168581

(51) Int. Cl.
*B01L 3/00* (2006.01)
*H01H 29/04* (2006.01)
(Continued)

(52) U.S. Cl.
CPC ..... *B01L 3/502715* (2013.01); *H01H 1/0036* (2013.01); *H01H 29/04* (2013.01);
(Continued)

(58) Field of Classification Search
CPC .. G05F 3/00; H01J 49/022; H03L 7/00; B01L 3/00; B01L 3/502715; H01H 29/04; H01H 2029/008; H02M 2005/2932
See application file for complete search history.

(56) References Cited

U.S. PATENT DOCUMENTS 5,146,785 A 9/1992 Riley ............................. 73/313
6,748,804 B1 * 6/2004 Lisec .................... G01F 23/242
73/290 R
(Continued)

FOREIGN PATENT DOCUMENTS

EP 0 262 507 A2 4/1988
EP 1 173 599 A2 1/2002
(Continued)

OTHER PUBLICATIONS

Ito, Masatoshi, et al., "Low Physical Restriction MEMS Potentiometer Using Probe Dipping Pool with Conductive Liquid", © 2010 IEEE, 2010 IEEE 23rd International Conference on Micro Electro Mechanical Systems (MEMS), Jan. 24, 2010, 4 pgs.

*Primary Examiner* — Luan V Van
*Assistant Examiner* — Caitlyn Mingyun Sun
(74) *Attorney, Agent, or Firm* — Harrington & Smith

(57) ABSTRACT

An apparatus and method, the apparatus including a channel; at least one pair of electrodes provided within sides of the channel; a conductor configured to move through the channel such that when the conductor is positioned between the at least one pair of electrodes a current path is provided through the at least one pair of electrodes and the conductor; and wherein the at least one pair of electrodes are configured such that the position of the conductor within the channel controls the length of the current path and enables a time varying voltage to be provided.

19 Claims, 9 Drawing Sheets

(51) Int. Cl.
    *H02M 5/293*    (2006.01)
    *H01H 29/00*    (2006.01)
    *H01H 1/00*    (2006.01)
    *G01N 27/447*    (2006.01)

(52) U.S. Cl.
    CPC ............... *H01H 2029/008* (2013.01); *H02M 2005/2932* (2013.01)

(56) References Cited

U.S. PATENT DOCUMENTS

| | | | |
|---|---|---|---|
| 2005/0118705 A1 | 6/2005 | Rabbitt et al. | ............. 435/287.1 |
| 2006/0013731 A1 | 1/2006 | Stout et al. | ................... 422/68.1 |
| 2012/0193237 A1* | 8/2012 | Afzali-Ardakani | .... B82Y 15/00 204/627 |
| 2014/0021965 A1* | 1/2014 | De Rybel | ............... G01R 15/06 324/632 |
| 2014/0124370 A1* | 5/2014 | Short | ............... B01L 3/502761 204/547 |

FOREIGN PATENT DOCUMENTS

| | | |
|---|---|---|
| EP | 1 235 238 a2 | 8/2002 |
| EP | 1580552 A1 | 9/2005 |
| JP | S-13-002423 | 2/1938 |
| JP | S-6391530 A | 4/1988 |
| JP | 2003-209677 | 3/2003 |
| JP | 2005-283581 | 10/2005 |
| JP | 2007066737 A | 3/2007 |
| JP | 2010282890 A | 12/2010 |
| WO | WO-0063408 A2 | 10/2000 |

* cited by examiner

APPARATUS AND METHOD FOR PROVIDING A TIME VARYING VOLTAGE

TECHNOLOGICAL FIELD

Examples of the disclosure relate to an apparatus and method for providing a time varying voltage. In particular, examples of the disclosure relate to an apparatus and method for providing a time varying voltage to a sample to enable an analyte to be detected within the sample.

BACKGROUND

Apparatus which provide time varying voltages are known. Such voltages may be used to test the conductivity of a sample and determine the presence and/or concentration of an analyte within the sample.

The electronics typically used to provide a time varying voltage are complex and require components such as a microcontroller, timing circuitry, memory, dedicated software/firmware and power management.

It is useful to provide a simpler apparatus for providing a time varying voltage.

BRIEF SUMMARY

According to various, but not necessarily all, examples of the disclosure, there may be provided an apparatus comprising: a channel; at least one pair of electrodes provided within sides of the channel; a conductor configured to move through the channel such that when the conductor is positioned between the at least one pair of electrodes a current path is provided through the at least one pair of electrodes and the conductor; and wherein the at least one pair of electrodes are configured such that the position of the conductor within the channel controls the length of the current path and enables a time varying voltage to be provided.

In some examples the apparatus may be configured to enable the time varying voltage to be provided to a sample to enable an analyte to be detected within the sample.

In some examples the channel and the conductor may be configured such that the conductor moves through the channel at a controlled rate.

In some examples the channel may comprise a microfluidic channel.

In some examples the conductor may comprise a conducting liquid. A non-conducting liquid is provided adjacent to the conducting liquid. The conducting liquid and the non-conducting liquid may be immiscible.

In some examples a plurality of pairs of electrodes may be provided along the length of the channel such that as the conductor moves through the channel the conductor sequentially disconnects from a first pair of electrodes and connects to a second pair of electrodes. Different pairs of electrodes may enable different power sources to be connected to the conductor.

In some examples a first electrode and a second electrode may be provided and the conductor may be configured to move along the lengths of the electrodes so that the length of the current path within the electrodes changes as the conductor moves through the channel. At least one of the electrodes may have a resistivity which is high enough to enable the change in the length of the electrical path through the electrode to provide a change in the voltage. In some examples the apparatus may further comprise a plurality of contacts connected to an electrode so as to enable a wave form varying voltage to be provided.

According to various, but not necessarily all, examples of the disclosure, there may be provided a test device comprising an apparatus as described above.

According to various, but not necessarily all, examples of the disclosure, there may be provided a method comprising: providing a channel; providing at least one pair of electrodes provided within sides of the channel; providing a conductor configured to move through the channel such that when the conductor is positioned between the at least one pair of electrodes a current path is provided through the at least one pair of electrodes and the conductor; and wherein the at least one pair of electrodes are configured such that the position of the conductor within the channel controls the length of the current path and enables a time varying voltage to be provided.

In some examples the method may further comprise enabling the time varying voltage to be provided to a sample to enable an analyte to be detected within the sample.

In some examples the channel and the conductor may be configured such that the conductor moves through the channel at a controlled rate.

In some examples the channel may comprise a microfluidic channel.

In some examples the conductor may comprise a conducting liquid. A non-conducting liquid may be provided adjacent to the conducting liquid. The conducting liquid and the non-conducting liquid may be immiscible.

In some examples a plurality of pairs of electrodes may be provided along the length of the channel such that as the conductor moves through the channel the conductor sequentially disconnects from a first pair of electrodes and connects to a second pair of electrodes. Different pairs of electrodes may enable different power sources to be connected to the conductor.

In some examples a first electrode and a second electrode may be provided and the conductor may be configured to move along the lengths of the electrodes so that the length of the current path within the electrodes changes as the conductor moves through the channel.

In some examples at least one of the electrodes may have a resistivity which is high enough to enable the change in the length of the electrical path through the electrode to provide a change in the voltage.

According to various, but not necessarily all, examples of the disclosure there may be provided examples as claimed in the appended claims.

BRIEF DESCRIPTION

For a better understanding of various examples that are useful for understanding the detailed description, reference will now be made by way of example only to the accompanying drawings in which:

FIGS. 7A to 7D illustrates an apparatus and a time varying voltage provided by the apparatus;

DETAILED DESCRIPTION

Figure 1:
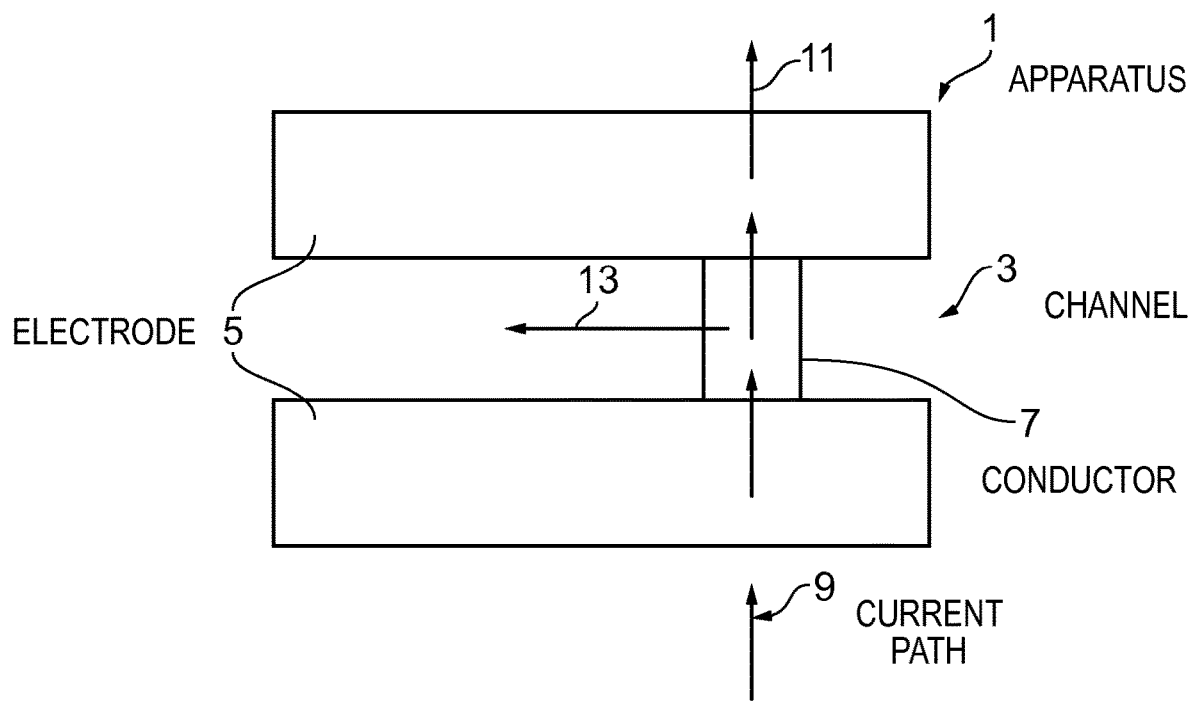
FIG. 1 illustrates an apparatus.

The figures illustrate an apparatus 1 comprising: a channel 3; at least one pair of electrodes 5 provided within sides of the channel 3; a conductor 7 configured to move through the channel 3 such that when the conductor 7 is positioned between the at least one pair of electrodes 5 a current path 9 is provided through the at least one pair of electrodes 5 and the conductor 7; and wherein the at least one pair of electrodes 5 are configured such that the position of the conductor 7 within the channel 3 controls the length of the current path 9 and enables a time varying voltage to be provided.

The apparatus 1 may be for providing a time varying voltage. Examples of the apparatus 1 may be used in test devices for providing a time varying voltage to a sample to enable an analyte to be detected within the sample. The apparatus 1 may be a disposable apparatus. The apparatus 1 may be discarded after use.

FIG. 1 schematically illustrates an apparatus 1 according to examples of the disclosure. The apparatus 1 comprises a channel 3, at least one pair of electrodes 5 and a conductor 7. In some examples the apparatus 1 may be provided within a test device. In a test device the apparatus 1 may be connected to a power source and a test sample so as to enable the time varying voltage to be provided to the test sample.

The channel 3 may comprise a passage through which the conductor 7 may move. The size and shape of the channel 3 may be configured so as to control the rate at which the conductor 7 moves through the channel 3. The conductor 7 may move through the channel 3 without any external or additional force being applied to the conductor 7 or the channel 3.

In some examples the channel 3 may comprise a microfluidic channel. The microfluidic channel 3 may comprise means for enabling flow of a small volume of fluid. The microfluidic channel 3 may be any suitable size or shape for providing a flow path for a small volume of fluid. The volumes of fluid which can be provided within the channel 3 may be of the order of µL.

The at least one pair of electrodes 5 may comprise any conductive material which may provide part of a current path 9. The electrodes 5 may comprise copper or indium tin oxide (ITO) or any other suitable material.

The at least one pair of electrodes 5 may be provided within the walls of the channel 3. The channel 3 may provide a gap between the pair of electrodes 5. The electrodes 5 may be arranged so that when a conductor 7 is positioned within the channel 3 the conductor 7 may move through the gap between the electrodes. When a conductor 7 is positioned between the pair of electrodes 5 this may create a direct electrical connection between the conductor 7 and the electrodes 5 and so provides a current path 9 through the conductor 7 and the electrodes 5.

In some examples only one pair of electrodes 5 may be provided within the channel. In such examples a first electrode 5 may form one side wall of the channel 3 and the other electrode 5 may form the other side wall of the channel 3. In other examples a plurality of different pairs of electrodes 5 may be provided within the channel 3. In such examples the pairs of electrodes 5 may be positioned at different points along the length of the channel 3 so that the conductor 7 can be connected to different pairs of electrodes 5 at different points within the channel 3. This may enable the conductor 7 and the electrodes 5 to establish different current paths 9. Examples of different arrangements of electrodes 5 are illustrated in more detail in FIGS. 2 to 9.

The conductor 7 may comprise any electrically conductive material which may be configured to move through the channel 3 at a controlled rate. In the example of FIG. 1 the conductor 7 moves along the length of the channel 3 as indicated by the arrow 13. In some examples the conductor 7 may only move in one direction through the channel 3.

In some examples the conductor 7 may comprise a liquid which may be configured to move through the channel 3. In some such examples the liquid may flow through the channel 3 by capillary action. In such examples the rate at which the conductor 7 moves through the channel 3 may be controlled by the dimensions of the channel 3, the surface energy of the liquid, the surface energy of the channel 3 and the viscosity of the liquid.

It is to be appreciated that other means may be used to control the rate at which the conductor 7 moves through the channel 3. For example, in some apparatus 1 the rate at which the conductor 7 moves through the channel 3 could be controlled by a pressure difference within the channel 3. In such examples the conductor 7 could be a solid or a liquid. The conductor 7 could be stored in a high pressure reservoir and released into the channel 3 when needed. The rate at which the conductor 7 moves through the channel 3 may be controlled by the pressure difference provided within the channel 3.

When the conductor 7 is not positioned within the channel 3 a gap is provided between the pair of electrodes 5 and no direct current path 9 is provided through the electrodes 5. When the conductor 7 moves into the channel 3 it comes into contact with the electrodes 5 and provides a direct current path 9 through the electrodes 5. In FIG. 1 the current path 9 is indicated by the arrows 11. The electrodes 5 and conductor 7 are arranged so that the length of the current path 9 is dependent upon the position of the conductor 7 within the channel 3. As the conductor 7 moves through the channel 3 this enables the conductor 7 to make electrical contact with different pairs of electrodes 5 and/or different parts of a pair of electrodes 5. This causes a change in the length of the current path 9 and provides a time varying current path 9. When the apparatus 1 is connected to a power source this enables a time varying voltage to be provided. Examples of arrangements of electrodes 5 and different current paths are illustrated in more detail in FIGS. 2 to 9.

Figure 2:
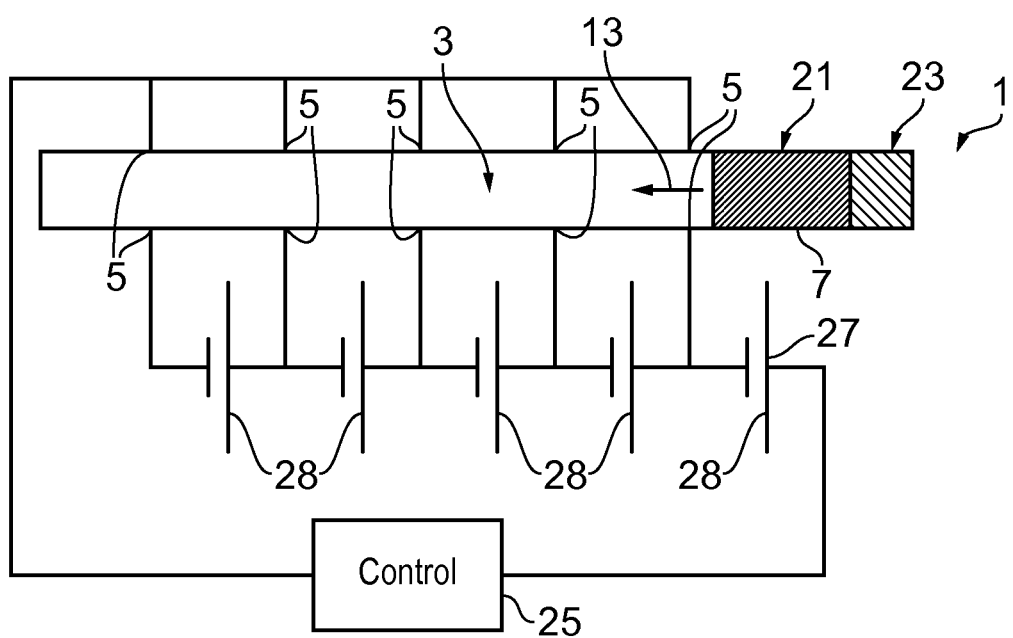
FIG. 2 illustrates an apparatus.

FIG. 2 schematically illustrates an apparatus 1 according to an example of the disclosure. The example apparatus 1 of FIG. 2 comprises a channel 3, a plurality of pairs of electrodes 5 and a conductor 7.

In the example of FIG. 2 the conductor 7 comprises a conductive liquid 21 and the channel 3 comprises a microfluidic channel 3 or any other channel 3 which enables the conductive liquid 21 to flow through the channel 3 by capillary action. In such examples the flow rate of the conductive liquid 21 is determined by the dimensions of the channel 3, the surface energy of the liquid 21 the surface energy of the channel 3 and the viscosity of the liquid 21. This enables the rate at which the conductor 7 moves through the channel 3 to be controlled.

In the example of FIG. 2 a non-conducting liquid 23 is provided adjacent to the conducting liquid 21. The non-conducting liquid 23 may be provided adjacent to the conducting liquid 21 to ensure that a net force is provided on the conducting liquid 21. The non-conducting liquid 23 may be arranged so that the surface energy on one side of the conducting liquid 21 is higher than on the other side of the conducting liquid 21. The non-conducting liquid 23 may be arranged so that the conducting liquid 21 moves along the length of the channel 3 as indicated by the arrow 13.

The non-conducting liquid 23 may comprise any material which provides an electrical insulator so that when the non-conducting liquid 23 is positioned between a pair of electrodes 5 there is no direct current path 9 between the electrodes 5. The non-conducting liquid 23 may be configured to ensure that the current path 9 is only provided through a pair of electrodes 5 which are in contact with the conducting liquid 21. The non-conducting liquid 23 may be arranged to break the direct current path 9 between the electrodes 5 as the two liquids 21, 23 move through the channel 3.

The non-conducting liquid 23 may be immiscible with the conducting liquid 21. This may prevent the two liquids 21, 23 mixing and ensure that the current path 9 is only provided through the pair of electrodes 5 which are in contact with the conducting liquid 21. In some examples the conducting liquid 21 could comprise a water based ionic solution, such as salt water, and the non-conducting liquid 23 could comprise a water immiscible solvent such as toluene or hexane. Other materials may be used in other examples of the disclosure.

In the example apparatus 1 of FIG. 2 the channel 3 comprises a plurality of pairs of electrodes 5. The different pairs of electrodes 5 are provided at different points along the length of the channel 3. The different pairs of electrodes 5 are arranged so that a gap is provided between each adjacent pair of electrodes 5. The spacing between the adjacent pairs of electrode 5 extends along the length of the channel 3.

In the particular example of FIG. 2 the apparatus 1 comprises five pairs of electrodes 5. It is to be appreciated that any number of pairs of electrodes 5 may be provided in other examples of the disclosure.

The volume of conducting fluid 21 is such that the conducting fluid 21 is only in contact with one pair of electrodes 5 at any time. The volume of the conducting fluid 21 and the spacing between the electrodes 5 may be such that as the conducting fluid 21 breaks a connection with a first pair of electrodes 5 it immediately establishes a connection with the next pair of electrodes 5. This may ensure that a direct current path 9 is always provided by the apparatus 1 when the conductor 7 is moving through the channel 3.

In the example of FIG. 2 the different pairs of electrodes 5 are equally spaced along the length of the channel 3 and the channel 3 has a constant width. It is to be appreciated that other arrangements of the channel 3 and the electrodes 5 may be used in other examples of the disclosure.

In the example of FIG. 2 the apparatus 1 is connected to a power source 27. The power source 27 comprises a plurality of different battery cells 28. The plurality of different battery cells 28 are connected in series. Each of the battery cells 28 is connected to a different pair of electrodes 5. This enables each pair of electrodes 5 to connect a different number of battery cells to the conducting liquid 21. This enables a time varying voltage to be provided as the conducing liquid 21 moves through the channel 3. FIGS. 3A to 3E illustrate examples of the different current paths 9 that may be provided by the apparatus 1 as the conducting liquid 21 moves through the channel 3.

The apparatus 1 is also connected to a control box 25. The control box 25 may use the time varying voltage provided by the apparatus 1 to make measurements. In some examples the control box 25 may be connected to a test sample to enable the time varying voltage to be used to detect the presence and/or concentration of an analyte within a test sample. For instance the time varying voltage could be used to detect the amount of glucose or any other suitable analyte in a blood sample or other type of sample.

FIGS. 3A to 3E illustrate the example apparatus 1 of FIG. 2 and the different current paths 9 that may be provided as the conducting liquid 21 moves through the channel 3.

In the example of FIG. 2 the conducting liquid 21 has not yet made contact with any of the electrodes 5. For instance the conducting liquid 21 may be stored in a reservoir or a barrier may be provided to prevent the conducing liquid 21 from moving through the channel 3. The apparatus 1 may be provided in the arrangement of FIG. 2 when the apparatus 1 is in storage and/or before the apparatus 1 is used. As the conducting liquid 21 is not in contact with any of the electrodes 5 this prevents any chemical reaction between the electrodes 5 and the conducting liquid 21. This prevents degradation of the electrodes 5 and may enable an apparatus 1 with a long shelf life to be provided.

In FIGS. 3A to 3E the barrier has been removed and the conducting liquid 21 is moving through the channel 3 in the direction indicated by the arrow 13. Each of FIGS. 3A to 3E show the apparatus 1 at successive points in time as the conducting liquid 21 moves through the channel 3.

Figure 3A:
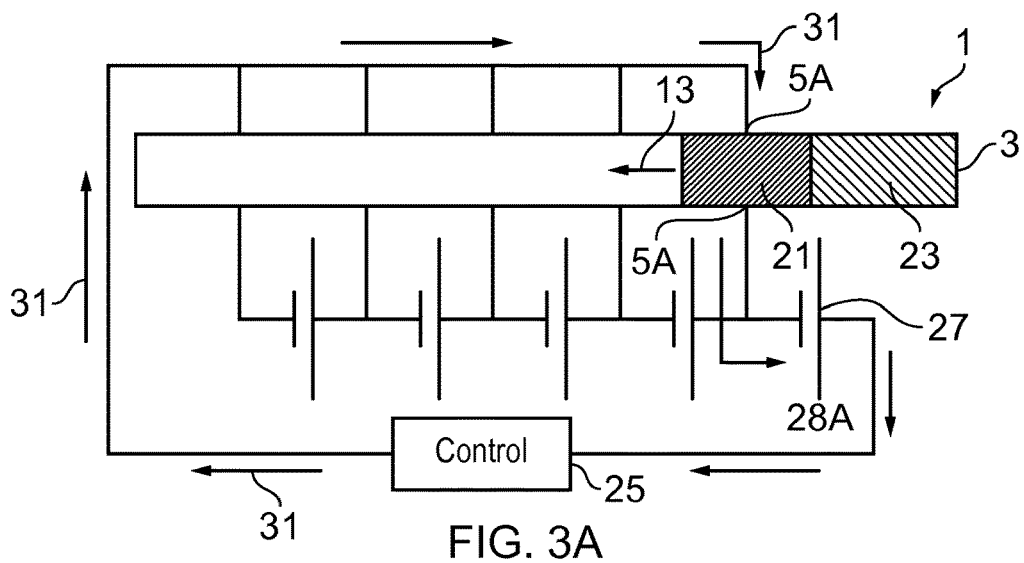
FIGS. 3A to 3E illustrates an apparatus and different current paths.

In FIG. 3A the conducting liquid 21 is positioned between a first pair of electrodes 5A. The conducting liquid 21 is connected to the electrodes 5A so that direct current can flow from a first electrode to a second electrode through the conducting liquid 21. This creates a first current path 9A as indicated by the arrows 31. This first current path 9A passes through the first pair of electrodes 5A and a first cell 28A from the power source 27. This enables the first cell 28A to be connected to the control box 25. This provides a first voltage to the control box 25.

In the example of FIG. 3A the non-conducting liquid 23 is provided behind the conducting liquid 21 is not positioned between any electrodes 5.

Figure 3B:
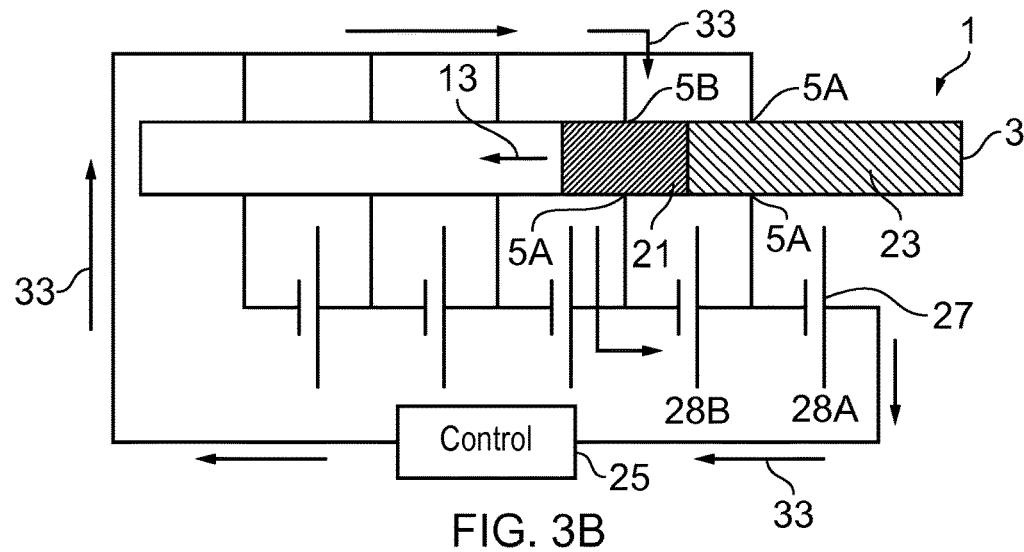

FIG. 3B shows the apparatus 1 at a later point in time. In FIG. 3B the conducting liquid 21 has moved further down the channel 3 so that the conducting liquid 21 is now positioned between a second pair of electrodes 5B. The second pair of electrodes 5B is adjacent to the first pair of electrodes 5A. The movement of the conducting liquid 21 breaks the connection between the first pair of electrodes 5A and creates a connection with the second pair of electrodes 5B. This creates a second current path 9B indicated by the arrows 33. The second current path 9B passes through the second pair of electrodes 5B and the first cell 28A and second cell 28A from the power source 27. This enables the first cell 28A and the second cell 28B to be connected to the control box 25. This provides a second voltage to the control box 25. The second voltage is different to the first voltage. The second voltage may be higher than the first voltage. As the cells 28 of the power source 27 are connected in series the second voltage is given by the sum of the two voltage of the two cells 28A, 28B that have been connected.

In the example of FIG. 3B the non-conducting liquid 23 is positioned between the first pair of electrodes 5A. This breaks the connection between the first pair of electrodes 5A and ensures that the first current path 9A is broken.

Figure 3C:
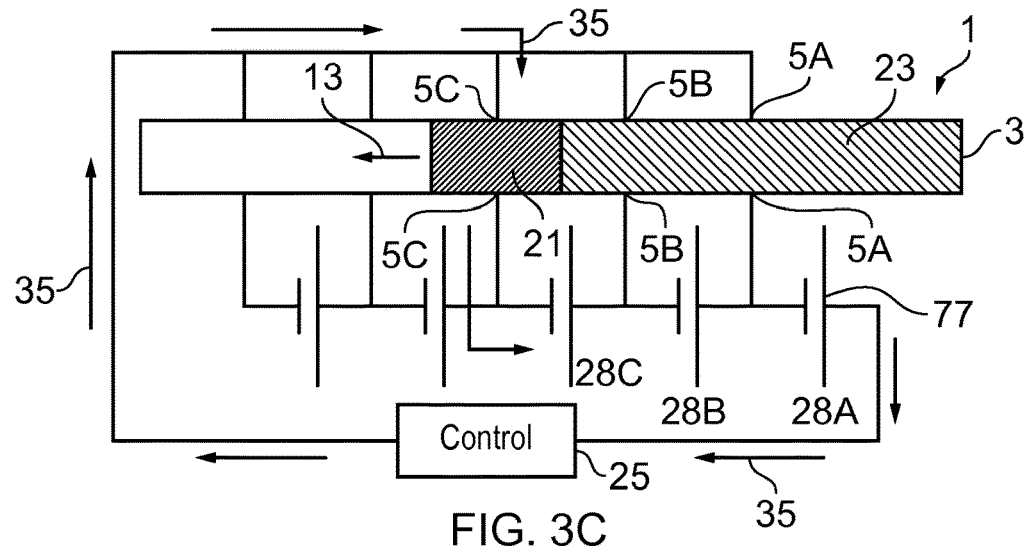

FIG. 3C shows the apparatus 1 at a later point in time than FIG. 3B. In FIG. 3C the conducting liquid 21 has moved even further down the channel 3 so that the conducting liquid 21 is now positioned between a third pair of electrodes 5C. The third pair of electrodes 5C is adjacent to the second pair of electrodes 5B. The further movement of the conducting liquid 21 breaks the connection between the second pair of electrodes 5B and creates a connection with the third pair of electrodes 5C. This creates a third current path 9C indicated by the arrows 35. The third current path 9C passes through the third pair of electrodes 5C and the first cell 28A, second cell 28B and a third cell 28C from the power source 27. This enables the cells 28A to 28C to be connected to the control box 25. This provides a third voltage to the control box 25. The third voltage is different to the first and second voltages. The third voltage may be higher than the first and second voltages and may be given by the sum of the voltages of the cells 28A, 28B, 28C connected in series.

In the example of FIG. 3C the non-conducting liquid 23 is positioned between both the first pair of electrodes 5A and second pair of electrodes 5B. This breaks the connection between the previously connected pairs of electrodes 5A, 5B and ensures that the previous current paths 9A, 9B are broken.

Figure 3D:
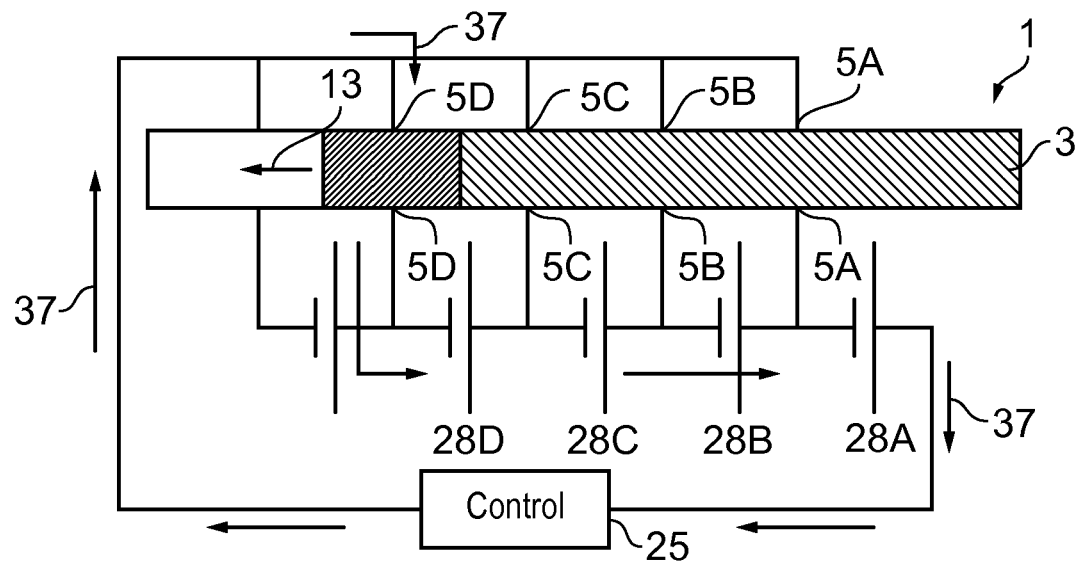

FIG. 3D shows the apparatus 1 at a later point in time than FIG. 3C. In FIG. 3D the conducting liquid 21 has moved even further down the channel 3, compared to the configuration of FIG. 3C so that the conducting liquid 21 is now positioned between a fourth pair of electrodes 5D. The fourth pair of electrodes 5D is adjacent to the third pair of electrodes 5C. The further movement of the conducting liquid 21 breaks the connection between the third pair of electrodes 5C and creates a connection with the fourth pair of electrodes 5D. This creates a fourth current path 9D indicated by the arrows 37. The fourth current path 9D passes through the fourth pair of electrodes 5D and the first cell 28A, second cell 28B, third cell 28C and a fourth cell from the power source 27. This enables the cells 28A to 28D to be connected to the control box 25. This provides a fourth voltage to the control box 25. The fourth voltage is different to the previous voltages. The fourth voltage may be higher than the previous voltages and may be given by the sum of the voltages of the cells 28A, 28B, 28C, 28D connected in series.

In the example of FIG. 3D the non-conducting liquid 23 is positioned between the first pair of electrodes 5A, second pair of electrodes 5B and third pair of electrodes. This breaks the connection between the previously connected pairs of electrodes 5A, 5B, 5C and ensures that the previous current paths 9A, 9B, 9C are broken.

Figure 3E:
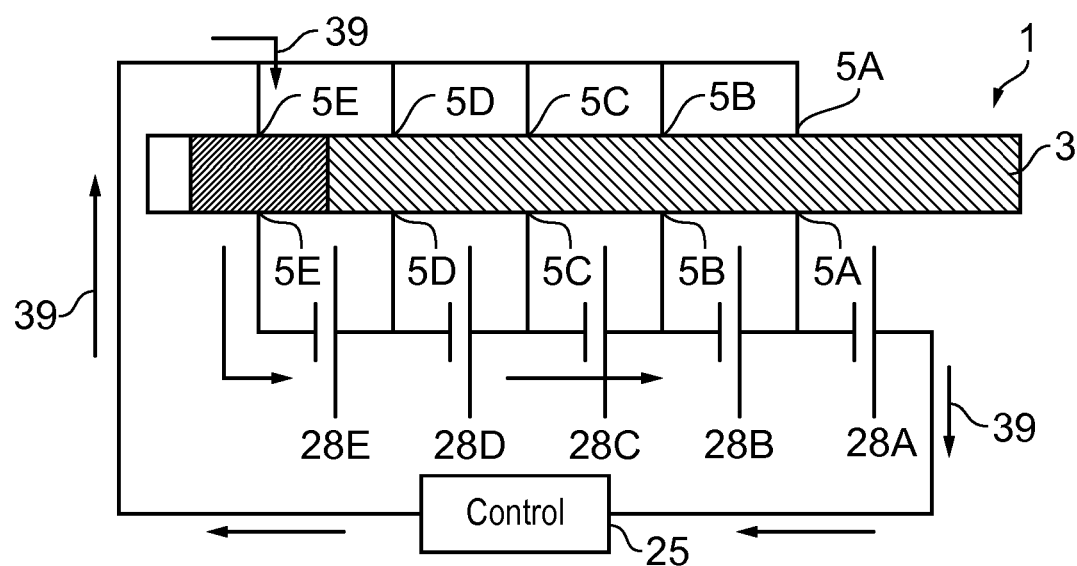

FIG. 3E shows the apparatus 1 at a later point in time than FIG. 3D. In FIG. 3E the conducting liquid 21 has moved even further down the channel 3, compared to the configuration of FIG. 3D so that the conducting liquid 21 is now positioned between a fifth pair of electrodes 5E. The fifth pair of electrodes 5E is adjacent to the fourth pair of electrodes 5D. The further movement of the conducting liquid 21 breaks the connection between the fourth pair of electrodes 5D and creates a connection with the fifth pair of electrodes 5E. This creates a fifth current path 9E indicated by the arrows 39. The fifth current path 9E passes through the fifth pair of electrodes 5E and all of the cells 28A to 28E from the power source 27. This enables the cells 28A to 28E to be connected to the control box 25. This provides a fifth voltage to the control box 25. The fifth voltage is different to the previous voltages. The fifth voltage may be higher than the previous voltages and may be given by the sum of the voltages of the cells 28A, 28B, 28C, 28D, 28E connected in series.

In the example of FIG. 3E the non-conducting fluid 23 is positioned between all of the previously connected pairs of electrode 5A, 5B, 5C and 5D. This breaks the connection between the previously connected pairs of electrodes 5A, 5B, 5C, 5D and ensures that the previous current paths 9A, 9B, 9C, 9D are broken.

The examples of FIG. 3A to 3E may provide a ramp up voltage in which the voltage increases in discrete increments as successive cells 28 of the power source are connected. It is to be appreciated that different arrangements could be used to provide other time varying voltages in other examples of the disclosure.

Figure 4:
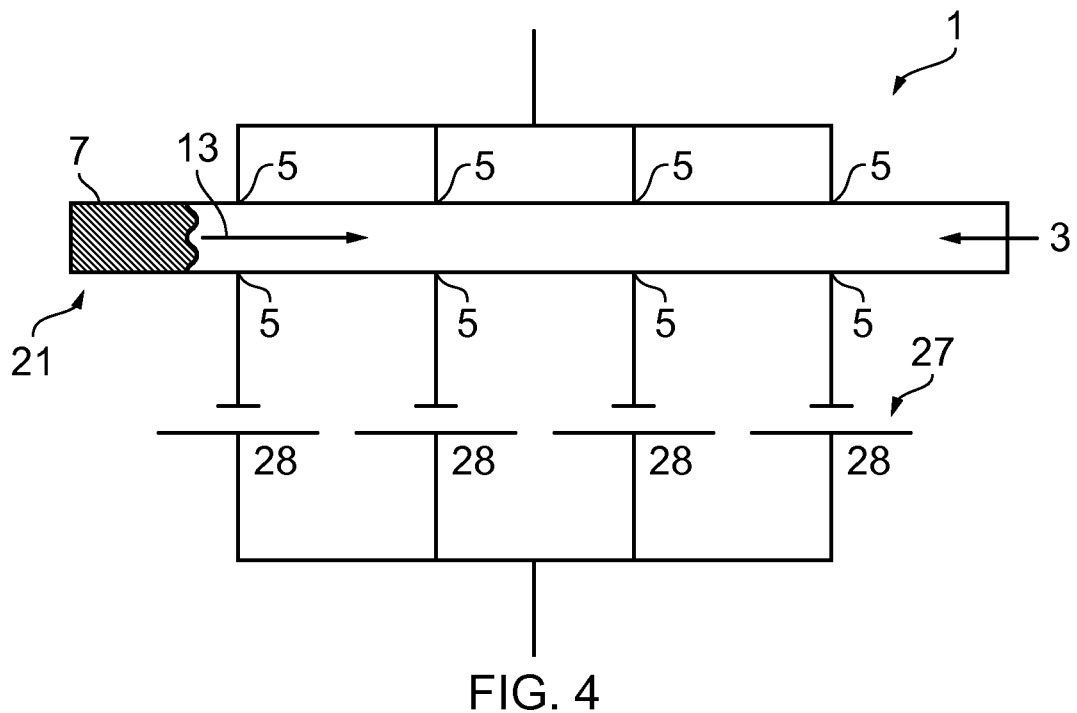
FIG. 4 illustrates an apparatus.

FIG. 4 illustrates another example apparatus 1 which could be used in some examples of the disclosure. The example apparatus 1 of FIG. 4 may also be used to provide a time varying voltage which varies in discrete increments.

The example apparatus 1 of FIG. 4 is similar to the apparatus 1 of FIGS. 2 and 3A to 3E as it comprises a conductive liquid 21 which flows through a channel 3 where the channel 3 comprises a plurality of pairs of electrodes 5. The apparatus 1 also comprises a power source 27 where the power source comprises a plurality of cells 28. The apparatus 1 of FIG. 4 differs from the previously described apparatus 1 in that in the examples of FIGS. 2 and 3A to 3E the respective cells 28 of the power source 27 are connected in series while in FIG. 4 the cells 28 are connected in parallel.

In the example of FIG. 4 the conducting liquid 21 may be configured to flow though the channel 3 at a controlled rate. The channel 3 may be a micro fluidic channel 3 a lateral flow sample or any other suitable channel 3. The conducing liquid 21 could be an electrolyte or a liquid metal or any other suitable material.

In the example of FIG. 4 the channel 3 comprises four pairs of electrodes 5. It is to be appreciated that other numbers of pairs of electrodes 5 may be provided in other examples of the disclosure. The four pairs of electrodes 5 are provided at intervals along the length of the channel 3. The pairs of electrodes 5 are configured so that when the conducting liquid 21 is positioned between a pair of electrodes 5 a direct current path 9 is provided from a first electrode to the second electrode through the conducting liquid 21.

In some examples a non-conducting liquid 23 may be provided adjacent to the conducting liquid 21. The non-conducting liquid 23 may provide an insulator between a pair of electrodes 5. The non-conducting liquid 23 may be arranged to break a connection created by the conducting liquid 21.

In some examples the volume of conducting liquid 21 may be such that only one pair of electrodes 5 is connected to the conducting liquid 21 at any one time. In such examples, as the conducting liquid 21 moves through the channel 3 a plurality of current paths 9 may be provided where each current path 9 passes through a different pair of electrodes 5 and connects to a different cell 28 of the power source 27. The voltage capacity of the cells 28 may be arranged so that the voltage provided by the apparatus 1 changes as the conducting liquid 21 moves through the channel 3.

In some examples, each cell 28 of the power source 27 may have a larger voltage capacity than the preceding cell 28. This may enable the apparatus 1 to provide a ramp up voltage. Similarly if each cell 28 has a smaller voltage than the preceding cell a ramp down voltage may be provided. It is to be appreciated that other time varying voltages could be provided in other examples of the disclosure.

In other examples of the disclosure the volume of conducting liquid 21 and the dimensions of the channel 3 may be such that the conducting liquid 21 may establish a connection with a plurality of pairs of electrodes 5 simultaneously. This may enable a plurality of cells 28 to be connected in parallel at any one time.

In such examples if all the cells 28 within the power source 28 are identical the maximum total current which could flow through the current path 9 is the sum of the current of the individual cells, and the total voltage is the same as the voltage of a single cell 28:

$$I_{tot}=I_1+I_2 \text{ and } V_{tot}=V_1=V_2.$$

If different cells 28 within the power source 28 have different voltages or different internal resistances then current will flow between the cells 28. In these examples the current flowing between two cells 28 in parallel is given by $$I_{2-1}=(V_2-V_1)/(R_2+R_1)$$

Where $V_2$ and $R_2$ are the voltage and internal resistance of the cell 28 with the higher voltage, and $V_1$ and $R_1$ are the voltage and internal resistance of the cell 28 with the lower voltage. In such examples if the internal resistances are low and the voltage step between the cells 28 is large, this can produce a large current flow between cells 28.

In such examples the voltage provided by the two parallel batteries is then given by:

$$V_p=V_2-(I_{2-1}*R_2)$$

Therefore, in examples of the disclosure the cells 28 may be selected to enable the desired voltage change as each cell 28 is added to the current without producing a large current flow between cells 28. This may be achieved by using cells 28 with large internal resistances and small voltage steps between adjacent cells.

Figure 5:
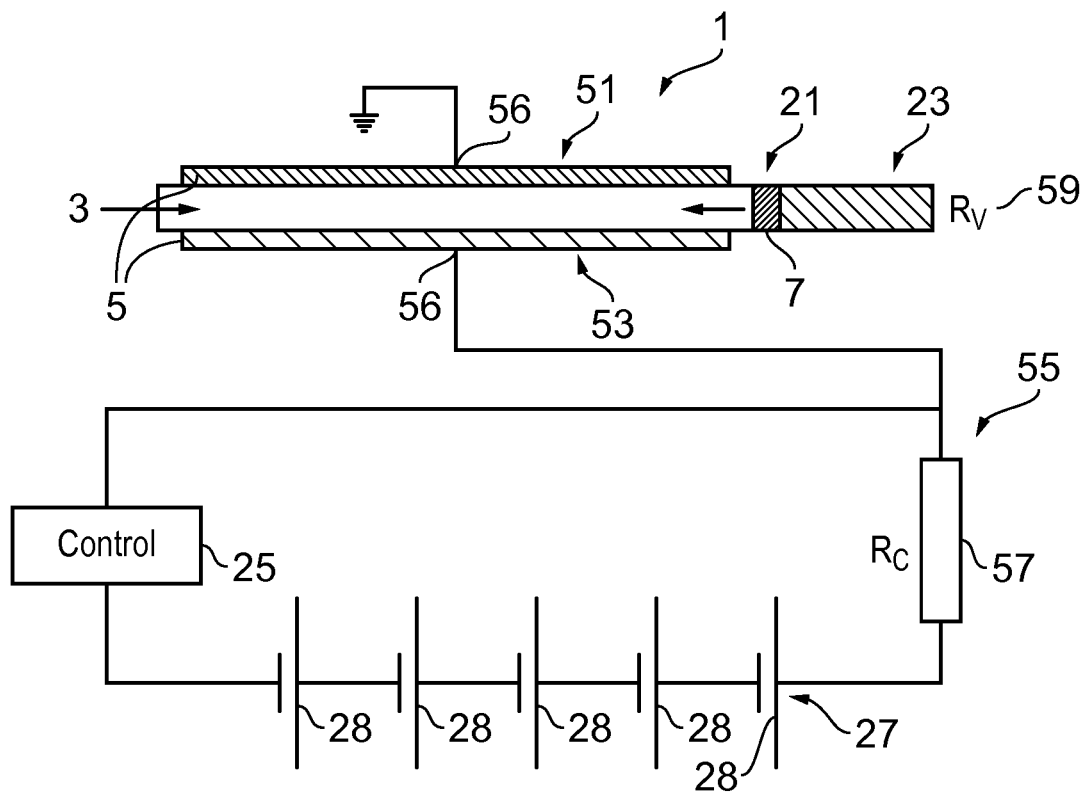
FIG. 5 illustrates an apparatus.

The example apparatus 1 of FIGS. 2 to 4 may be used to provide a discrete time varying voltage. FIG. 5 illustrates an example apparatus 1 which may be used to provide an analogue time varying voltage. In the example of FIG. 5 the apparatus 1 provides a potential divider.

The example apparatus 1 of FIG. 5 also comprises a channel 3 and a conductor 7 and a pair of electrodes 5. In the example apparatus 1 of FIG. 5 the conductor 7 comprises a conducting liquid 21. In the examples of FIG. 5 a non-conducing liquid 23 is also provided adjacent to the conducting fluid 21. The conducting liquid 21 and non-conducting liquid 23 may be as described previously. In the example of FIG. 5 the volume of conducting liquid 21 may be larger than the volume of non-conducting liquid 23.

In the example apparatus 1 of FIG. 5 only one pair of electrodes 5 is provided. A first electrode 51 is provided on one side of the channel 3 and a second electrode 53 is provided on the opposite side of the channel 3 so that the channel 3 provides a gap between the electrodes 51, 53. In the example of FIG. 5 each of the electrodes 51, 53 extend for the entire length of the channel 3.

The conducting fluid 21 may be arranged to flow through the gap between the electrodes 51, 53. The gap between the electrodes 51, 53 may be sized so that the conducting liquid 21 may flow through the channel 3 by capillary action.

The electrodes 51, 53 may be made of any suitable material in some examples both of the electrode 51, 53 may be made of the same material. The materials of the electrode 51, 53 may be chosen to ensure that there is a sufficient change in voltage as the length of the current path 9 through the electrodes 51, 53 changes. In some examples the two electrodes 51, 53 may be made of different materials. In some examples of the disclosure at least one of the electrodes 51, 53 may have a high sheet resistivity. For instance one or both of the electrodes 51, 53 could be formed from a material such as Indium tin oxide.

Each of the electrodes 51, 53 comprises a connection point 56. In the example of FIG. 5 the connection points 56 are provided in the centre of the electrodes 51, 53. The channel 3 extends for an equal distance in either direction from connection point 56 for each of the electrodes 51, 53. In the example of FIG. 5 both of the electrodes 51, 53 have a connection point 56 in the same position. In other examples of the disclosure the connections points 56 could be provided in different relative locations. In the examples of FIG. 5 only one connection point 56 is provided for each of the electrodes 51, 53. In other examples more than one connection point 56 could be provided.

In the example of FIG. 5 the first electrode 51 is connected to ground. The first electrode 51 may be connected directly to ground or intervening components may be provided.

The second electrode 53 is connected to circuitry 55. The circuitry 55 may enable the time varying voltage to be provided to a test sample. In the example of FIG. 5 the circuitry 55 comprises a power source 27, a control box 25 and a fixed resistor 57.

The power source 27 may comprise any suitable power source 27. In the example of FIG. 5 the power source 27 comprises a plurality of cells 28 however it is to be appreciated that any number of cells 27 could be provided in other examples of the disclosure.

The control box 25 may be as described previously. A test sample may be provided within the control box 25 to enable the sample to be analysed.

The resistor 57 may be a fixed value resistor and may be connected in series to the second electrode 53 so as to provide a potential divider.

Figure 6:
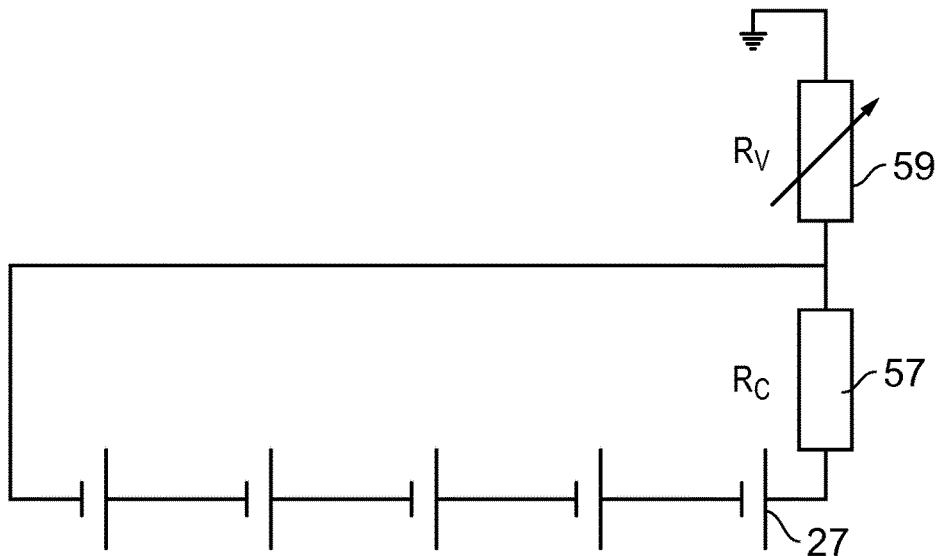
FIG. 6 illustrates a circuit diagram representing the apparatus of FIG. 5.

FIG. 6 illustrates a circuit diagram representing the apparatus 1 of FIG. 5. The electrodes 51, 53 and the moving conductor 7 provide the variable resistor 59. The total voltage across the variable resistor 59 and the fixed resistor 57 is constant and is equal to the voltage provided by the power source 27. The voltage across each of the individual resistors 57, 59 is determined by the ratio of the resistances.

$$V_C=V_{tot}*(R_C/R_{tot}) \quad V_V=V_{tot}*(R_V/R_{tot})$$

The example apparatus 1 of FIG. 5 may be used to provide an analogue change in time varying voltage. As the conducting liquid 21 moves through the channel 9 different current paths 9 are provided through the electrodes 51, 53 which changes the total resistance of the current path 9.

Figure 7D:
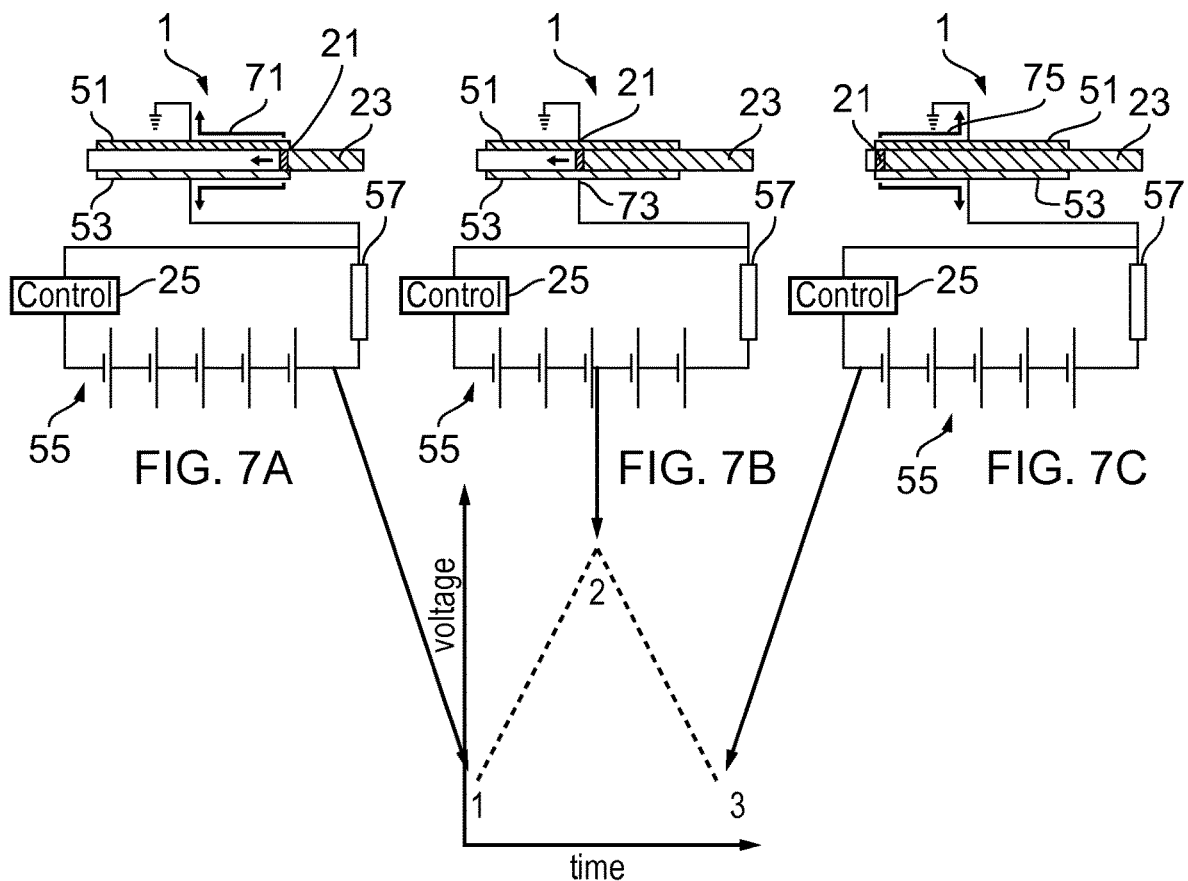

FIGS. 7A to 7C illustrate the example apparatus 1 of FIG. 5 at different points in time as the conducting liquid 21 moves through the channel. FIG. 7D shows the voltage which is provided at the different points in time.

FIG. 7A illustrates the apparatus 1 at a first point in time $t_1$. At $t_1$ the conducting liquid 21 is positioned at the right hand side of the channel 3. The current path 9, as indicated by arrows 71 extends from the contact point 56 of the first electrode 51, along the length of the first electrode 51 to the point at which the conducting liquid 21 contacts the first electrode 51, through the conducting liquid 21 and through the second electrode 53 to the contact point 56 of the second electrode 53. This is the longest current path 9 provided by the apparatus 1 and so provides the highest resistance for the apparatus 1 and the highest voltage across the apparatus 1. As shown in FIG. 7D this provides the lowest voltage across the fixed resistor 57.

As the conducting liquid 21 moves through the channel 3 the distance between the contact points 56 and the conducting liquid 21 decreases. This decreases the current path 9 length though the electrodes 51, 53 and will lead to an increase in voltage across the fixed resistor 57 as shown in FIG. 7D.

FIG. 7B illustrates the apparatus 1 at a second point in time $t_2$. At $t_2$ the conducting liquid 21 is positioned in the centre of the channel 3. The current path 9, as indicated by arrows 73 passes straight through the electrodes 51, 53 and the conducting liquid 21. This is the shortest current path 9 provided by the apparatus 1 and so provides the lowest resistance for the apparatus 1 and the lowest voltage across the apparatus 1. As shown in FIG. 7D this provides the highest voltage across the fixed resistor 57.

As the conducting liquid 21 continues to move through the channel 3 towards the left hand side of the channel 3 the distance between the contact points 56 and the conducting liquid 21 will increase. This increases the current path 9 length though the electrodes 51, 53 and will lead to a decrease in voltage across the fixed resistor 57 as shown in FIG. 7D.

FIG. 7C illustrates the apparatus 1 at a first point in time $t_3$. At $t_3$ the conducting liquid 21 is positioned at the left hand side of the channel 3. The current path 9, as indicated by arrows 75 mirrors the current path 71 at $t_1$ and extends from the contact point 56 of the first electrode 51, along the length of the first electrode 51 to the point at which the conducting liquid 21 contacts the first electrode 51, through the conducting liquid 21 and through the second electrode 53 to the contact point of the second electrode 53. As this current path is the same length as the current path at time $t_1$ the voltage drops to the same level as at time $t_1$.

Therefore the apparatus 1 of FIGS. 5 to 7D provides an analogue time varying voltage. The rate at which the voltage varies may be controlled by the rate at which the conducing liquid 21 flows through the channel 3. This may be determined by the width of the channel 3, the surface energy of conducting liquid 21 the surface energy of the channel 3 and the viscosity of the liquid 21.

The voltage which is provided may be controlled by the voltage capacity of the power source 27 and the resistivity of the materials which are used for the electrodes 51, 53 and the conducting fluid 21.

The apparatus 1 of FIGS. 5 to 7D provides a voltage which varies with a triangular wave form. In other examples it may be useful to provide a voltage which varies with a different waveform. For example the voltage could be provided as a square wave or a sine wave or in any other suitable format.

Figure 8:
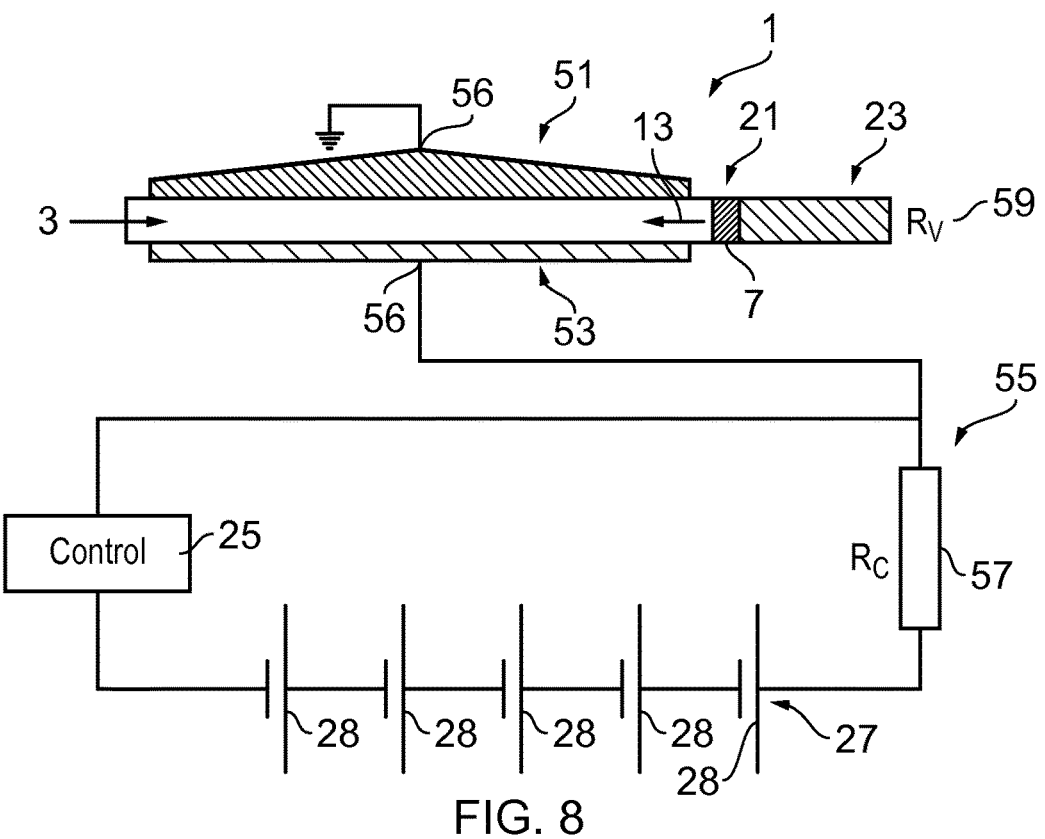
FIG. 8 illustrates an apparatus.

FIG. 8 illustrates an example apparatus 1 which may be used to control the waveform of the time varying voltage. The apparatus 1 of FIG. 8 is similar to the apparatus 1 of FIG. 5 and comprises a channel 3, a first electrode 51, a second electrode 53, connection points 56 and circuitry 55.

In the example of FIG. 8 the thickness of the first electrode 51 varies along the length of the first electrode 51. The variation in thickness controls the resistance per unit length of the electrode 51. In the particular example of FIG. 8 the first electrode 51 has a thickest point at the centre where the connection point 56 is provided. The thickness of the electrode 51 decreases towards the edges of the electrode 51. This change in the thickness of the electrode 51 will change the rate of increase or decrease in resistance. This may enable sine waves, square waves or other waveforms to be created.

In the example of FIG. 8 only the thickness of the first electrode 51 is varied. In other examples the thickness of the second electrode 53 may be varied instead of, or in addition to, the first electrode 51.

It is to be appreciated that the width or the thickness of the electrodes 51, 53 could be varied to control the resistance per unit length of the electrode 51, 53. In some examples it may be useful to vary the width of the electrodes 51, 53 as this may be easy to manufacture an electrode 51, 53 having a varying width using printing techniques or any other suitable method, It is to be appreciated that other means for varying the resistance of the electrodes may be used in other examples of the disclosure. For instance, the sheet resistance of the electrodes 51, 53 may vary.

In other examples the rate of flow of the conducting liquid 21 through the channel 3 may be controlled to control the waveform of the voltage that is provided. Any suitable means may be used to control the rate of flow of the liquid 21 through the channel 3.

In some examples the rate of flow of the conducting liquid 21 may be controlled by changing the dimensions of the channel 3. For instance increasing the width of the channel 3 would decrease flow rate and decreasing the width of the channel 3 will increase flow rate. In other examples the rate of flow of the conducting liquid 21 may be controlled by changing the surface energy of the channel 3. The surface energy of the channel 3 could be changed by any suitable means such as the addition of a thin film coating and/or graded microstructures. The graded microstructure could comprise micro-pillars with different lengths or density or any other suitable microstructures.

Figure 9:
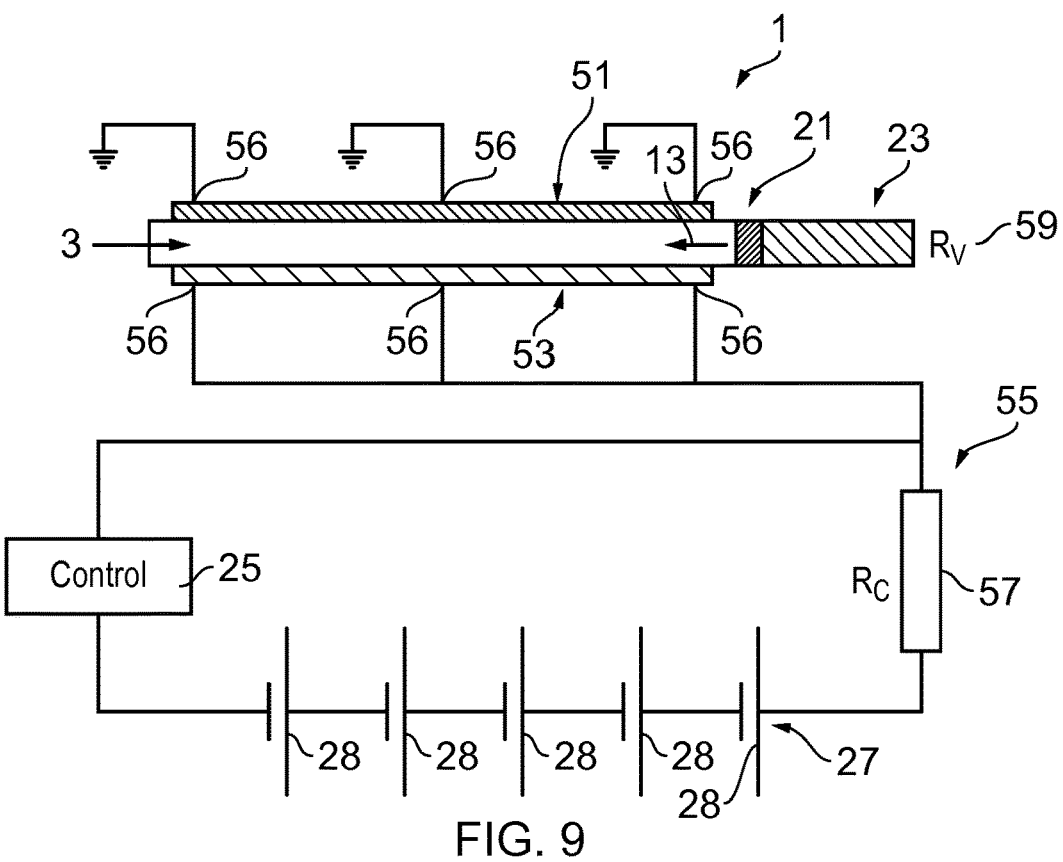
FIG. 9 illustrates an apparatus.

FIG. 9 illustrates another example apparatus 1. The example apparatus 1 of FIG. 9 may be used to provide multiple waveforms. The apparatus 1 of FIG. 9 is similar to the apparatus 1 of FIGS. 5 and 8 and comprises a channel 3, a first electrode 51, a second electrode 53 and circuitry 55.

In the example apparatus 1 of FIG. 9 a plurality of connection points 56 are provided along the length of the electrodes 51, 53. The spacing of the connection points 56 may determine the frequency of the voltage. The resistance of the electrodes 51, 53 may determine the amplitude of the voltage.

Figure 10:
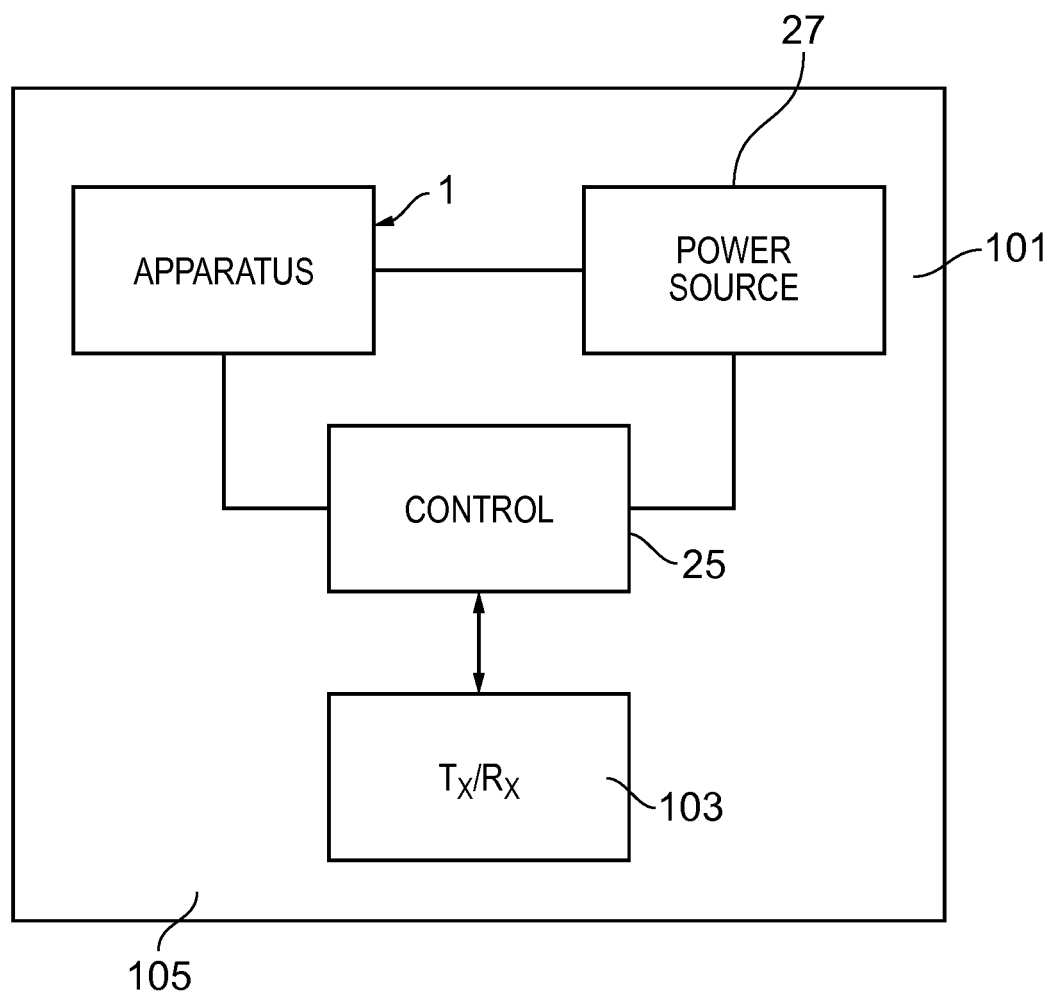
FIG. 10 illustrates an example test device.

FIG. 10 illustrates an example test device 101. The example test device 101 comprises an apparatus 1, a power source 27 and a control box 25 which may be as described previously.

The test device 101 may also comprise a transceiver 103. The transceiver may comprise a low power or passive transceiver 103. For example the transceiver 103 could comprise an RFID (radio frequency identification) antenna. The transceiver 103 may enable information which is obtained by the control box 25 to be read by another device.

The test device 101 may be provided on a substrate 105. The substrate may comprise a material such as card or plastic. This may enable the test device 101 to be portable and/or low cost.

Figure 11:
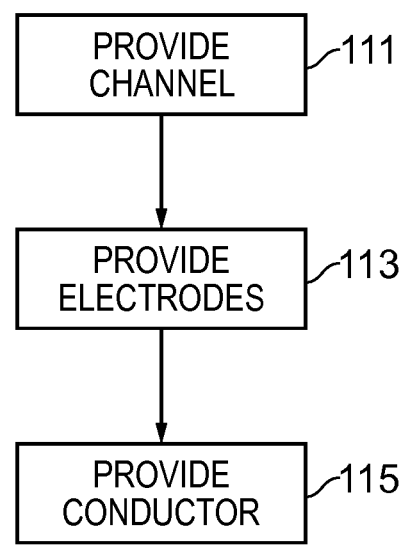
FIG. 11 illustrates a method.

FIG. 11 illustrates a method. The method may be used to provide apparatus 1 and test devices 101 such as the apparatus 1 and test devices 101 described above.

In the example of FIG. 11 the method comprises, at block 111 providing a channel 3. At block 113 the method may comprise providing at least one pair of electrodes 5 provided within sides of the channel 3 and at block 115 the method comprises providing a conductor 7 configured to move through the channel 3 such that when the conductor 7 is positioned between the at least one pair of electrodes 5 a current path 9 is provided through the at least one pair of electrodes 5 and the conductor 7; and wherein the at least one pair of electrodes 5 are configured such that the position of the conductor 7 within the channel 3 controls the length of the current path 9 and enables a time varying voltage to be provided.

Examples of the disclosure provide an apparatus 1 which may be used to provide a time varying voltage. The time varying voltage may be achieved by the movement of the conductor 7 through the channel 3. As this does not require any complicated circuitry, such as microcontroller, timing circuitry, memory or other components this provides a simple and low cost apparatus 1 for providing such voltages.

The apparatus 1 may be used in disposable devices which may be discarded after use. This may be useful for medical applications where biological samples may be tested using the time varying voltage.

The apparatus 1 and test device 101 may also be small and light weight which may enable them to be used in any location.

In the examples described above the term coupled means operationally coupled and any number or combination of intervening elements can exist (including no intervening elements).

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

For instance in some examples the apparatus 1 may also comprise one or more identification nodes. The identification modes may enable the sensor element and/or test result to be associated with a specific object.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
a substrate, said substrate having a channel, said channel having a pair of opposite sides and being a conduit for a conductor;
a plurality of pairs of electrodes within the opposite sides of the channel, each pair of said plurality of pairs of electrodes being spaced from the next along the channel in a sequence, each pair of electrodes having a first electrode and a second electrode, whereby, when the conductor, movable along the channel, is positioned between the first electrode and the second electrode of a pair of said plurality of pairs of electrodes, the conductor provides a path for electric current between the first electrode and the second electrode;
a control box, said control box being electrically connected to the first electrode of each pair of said plurality of pairs of electrodes; and
a power source, said power source being electrically connected to said control box, said power source further having a plurality of individual electric sources connected to one another in series, each individual electric source further being electrically connected to one of the second electrodes of said plurality of pairs of electrodes,
whereby, as the conductor moves along the channel between the first electrode and the second electrode of each pair of the plurality of pairs of electrodes in the sequence, a voltage varying in a step-wise manner in amounts equal to a voltage of at least one of the individual electric sources is provided to the control box for use in making measurements therewith.

2. The apparatus as claimed in claim 1 wherein the control box is connected to a test sample to be subjected to the time-varying voltage to enable an analyte to be detected within the test sample.

3. The apparatus as claimed in claim 1 wherein the conductor is moved through the channel at a controlled rate.

4. The apparatus as claimed in claim 1 wherein the channel is a microfluidic channel.

5. The apparatus as claimed in claim 1 wherein the conductor is a conducting liquid.

6. The apparatus as claimed in claim 5 wherein a non-conducting liquid is provided adjacent to the conducting liquid.

7. The apparatus as claimed in claim 6 wherein the conducting liquid and the non-conducting liquid are immiscible.

8. An apparatus comprising:
a substrate, said substrate having a channel, said channel having a pair of opposite sides and being a conduit for a conductor;
a first electrode and a second electrode within the opposite sides of the channel, said first electrode having a first connection point and said second electrode having a second connection point, whereby, when the conductor, movable along the channel, is positioned between the first electrode and the second electrode, the conductor provides a path for electric current between the first electrode and the second electrode, wherein said first electrode is electrically connected at said first connection point to an electric circuit and said second electrode is electrically connected at said second connection point to ground, said first and second electrodes together forming a variable resistor as said conductor moves along the channel in consequence of changing electrical paths within said first and second electrodes; and the electric circuit comprising a control box, a power source, and a fixed resistor electrically connected with one another in series to form the electric circuit, whereby, as the conductor moves along the channel between the first electrode and the second electrode, a length of a current path within the first electrode and the second electrode from the first connection point to the second connection point is changed, thereby changing a value of the variable resistor and enabling an analogue time-varying voltage to be provided to the control box for use in making measurements therewith.

9. The apparatus as claimed in claim 8 wherein at least one of the first and second electrodes has a resistivity enabling the change in the length of the electrical path through the electrode to provide a change in the voltage.

10. The apparatus as claimed in claim 8 wherein one of said first electrode is electrically connected to said electric circuit with a plurality of contacts and said second electrode is electrically connected to ground with a plurality of contacts to enable a waveform-varying voltage to be provided to the control box.

11. A test device comprising the apparatus as claimed in claim 1.

12. The apparatus as claimed in claim 8 wherein the control box is connected to a test sample to be subjected to the time-varying voltage to enable an analyte to be detected within the test sample.

13. The apparatus as claimed in claim 8 wherein the conductor is moved through the channel at a controlled rate.

14. The apparatus as claimed in claim 8 wherein the channel is a microfluidic channel.

15. The apparatus as claimed in claim 8 wherein the conductor is a conducting liquid.

16. The apparatus as claimed in claim 15 wherein a non-conducting liquid is provided adjacent to the conducting liquid.

17. The apparatus as claimed in claim 16 wherein the conducting liquid and the non-conducting liquid are immiscible.

18. A test device comprising the apparatus as claimed in claim 8.

19. An apparatus comprising:

a substrate, said substrate having a channel, said channel having a pair of opposite sides and being a conduit for a conductor;

a plurality of pairs of electrodes within the opposite sides of the channel, each pair of said plurality of pairs of electrodes being spaced from the next along the channel in a sequence, each pair of electrodes having a first electrode and a second electrode, whereby, when the conductor, movable along the channel, is positioned between the first electrode and the second electrode of a pair of said plurality of pairs of electrodes, the conductor provides a path for electric current between the first electrode and the second electrode;

a control box, said control box being electrically connected to the first electrode of each pair of said plurality of pairs of electrodes; and a power source, said power source being electrically connected to said control box, said power source further having a plurality of individual electric sources connected to one another in parallel, each individual electric source being electrically connected to one of the second electrodes of said plurality of pairs of electrodes, whereby, as the conductor moves along the channel between the first electrode and the second electrode of each pair of the plurality of pairs of electrodes in the sequence, a voltage varying in a step-wise manner in amounts equal to a voltage of at least one of the individual electric sources is provided to the control box for use in making measurements therewith.

* * * * *